(12) United States Patent
McLean et al.

(10) Patent No.: US 9,858,164 B1
(45) Date of Patent: Jan. 2, 2018

(54) PROVIDING AN INFORMATION TECHNOLOGY MANAGEMENT PRESCRIPTION

(75) Inventors: Jace McLean, Golden Valley, MN (US); Andrew Moravec, White Bear Lake, MN (US)

(73) Assignee: Crimson Corporation, Dover, DE (US)

( * ) Notice: Subject to any disclaimer, the term of this patent is extended or adjusted under 35 U.S.C. 154(b) by 180 days.

(21) Appl. No.: 13/592,975

(22) Filed: Aug. 23, 2012

(51) Int. Cl.
*G06F 11/30* (2006.01)
*H04L 12/24* (2006.01)

(52) U.S. Cl.
CPC ...... *G06F 11/3051* (2013.01); *H04L 41/0631* (2013.01); *H04L 41/0803* (2013.01)

(58) Field of Classification Search
CPC . H04L 41/0631; H04L 41/08; H04L 41/0803; H04L 41/0876; G06F 9/5077
USPC .................... 714/38, 37; 709/223
See application file for complete search history.

(56) References Cited

U.S. PATENT DOCUMENTS

| | | | | |
|---|---|---|---|---|
| 7,051,243 B2 * | 5/2006 | Helgren et al. | | 714/48 |
| 8,260,900 B2 * | 9/2012 | Morrison | | H04L 29/00 709/223 |
| 2003/0149756 A1 * | 8/2003 | Grieve et al. | | 709/223 |
| 2003/0177412 A1 * | 9/2003 | Todd | | G06F 11/0751 714/25 |
| 2007/0094375 A1 * | 4/2007 | Snyder | | G06Q 10/06 709/223 |
| 2007/0168874 A1 * | 7/2007 | Kloeffer | | G06Q 10/06 715/764 |
| 2008/0168311 A1 * | 7/2008 | Pietrek | | 714/33 |
| 2009/0007105 A1 * | 1/2009 | Fries et al. | | 718/1 |
| 2010/0286937 A1 * | 11/2010 | Hedley | | G06Q 30/02 702/60 |
| 2011/0080951 A1 * | 4/2011 | Komatsu | | H04N 19/159 375/240.12 |
| 2012/0005322 A1 * | 1/2012 | Nocera | | H04L 41/0856 709/223 |
| 2012/0203596 A1 * | 8/2012 | Guthridge | | G06Q 10/0637 705/7.37 |
| 2014/0007203 A1 * | 1/2014 | Branch et al. | | 726/5 |
| 2014/0039683 A1 * | 2/2014 | Zimmermann et al. | | 700/275 |
| 2014/0040862 A1 * | 2/2014 | Webster et al. | | 717/121 |

* cited by examiner

*Primary Examiner* — Kevin Bates
*Assistant Examiner* — Chen-Liang Huang (57) ABSTRACT

A method for providing a context sensitive information technology (IT) management prescription is described. In response to a user request, a scan is performed on a target computing environment and data is collected from the scan. The data is forwarded to a cloud based entity. At the cloud based entity the data is parsed in accordance with a dynamic set of rules to determine an IT management prescription specific to the context of the target computing environment. The IT management prescription is provided for access by the user.

20 Claims, 4 Drawing Sheets

PROVIDING AN INFORMATION TECHNOLOGY MANAGEMENT PRESCRIPTION

BACKGROUND

Many entities maintain and manage computing environments for their users. These computing environments may, for example include many physical and virtual machines that are coupled to one another in a network, and are managed centrally by one or more Information Technology (IT) professionals. Such computing environments often require updates and various patches. Conventionally, IT management activities are determined and implemented by an IT professional. For example, software updates are typically installed by an IT professional.

Often, there is no one to tell the IT professional when or whether to install particular updates or to perform particular IT management functions. For example, if a particular IT update is trending across the industry, unless that IT professional is current on her knowledge, she may be slow to react to emerging trends and may not react at all. In some cases, problems are determined by an IT professional on a point by point basis. In other words, an IT professional sometimes must gather data from disjointed sets of data maintained in separate systems in a plurality of formats and attempt to determine a course of action for IT management of one or more physical and/or virtual machines in a computing environment. In companies where few IT professionals work this can be a difficult task if there are a large number of IT assets to be managed and/or if the IT professional does not have extensive personal knowledge to draw upon.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "scanning," "forwarding," "parsing," "providing," "pushing," "pulling," "comparing," "receiving," "initiating," "utilizing" or the like, often refer to the actions and processes of an electronic computing device or system, such as one or more physical and/or virtual machines, of a target computing environment. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Herein various systems, methods and techniques for providing a context sensitive IT management prescription are described which utilize contextual information of a target computing environment to determine whether, and what type of, prescription to provide to an IT professional of a target computing environment. Herein various actions and outputs are ascribed to or provided by access for a "user" in a target computing environment. It should be appreciated that such a "user" is typically an IT professional or other person who performs IT management functions within a target computing environment. In some instances a "user" may be any authorized person of an IT management team/staff associated with a target computing environment.

Discussion begins with high level view of a system that scans target computing environments and sends the received data to a cloud based entity. A description of a cloud based entity that processes scanned data is then provided. Various techniques for scanning a target computing environment are described. Next, some example outputs from the cloud based entity which processed the scanned data are discussed. These outputs, which may comprise recommendations, actions, and alerts are then described. Next, some examples of additional operations of the cloud based entity are described, such as a return on investment calculator and a trend detector. Lastly, operation of the cloud based entity in conjunction with a target computing environment is further described through discussion of some example methods of operation.

Example Cloud Based Entity for Providing an IT Management Prescription

Figure 1:
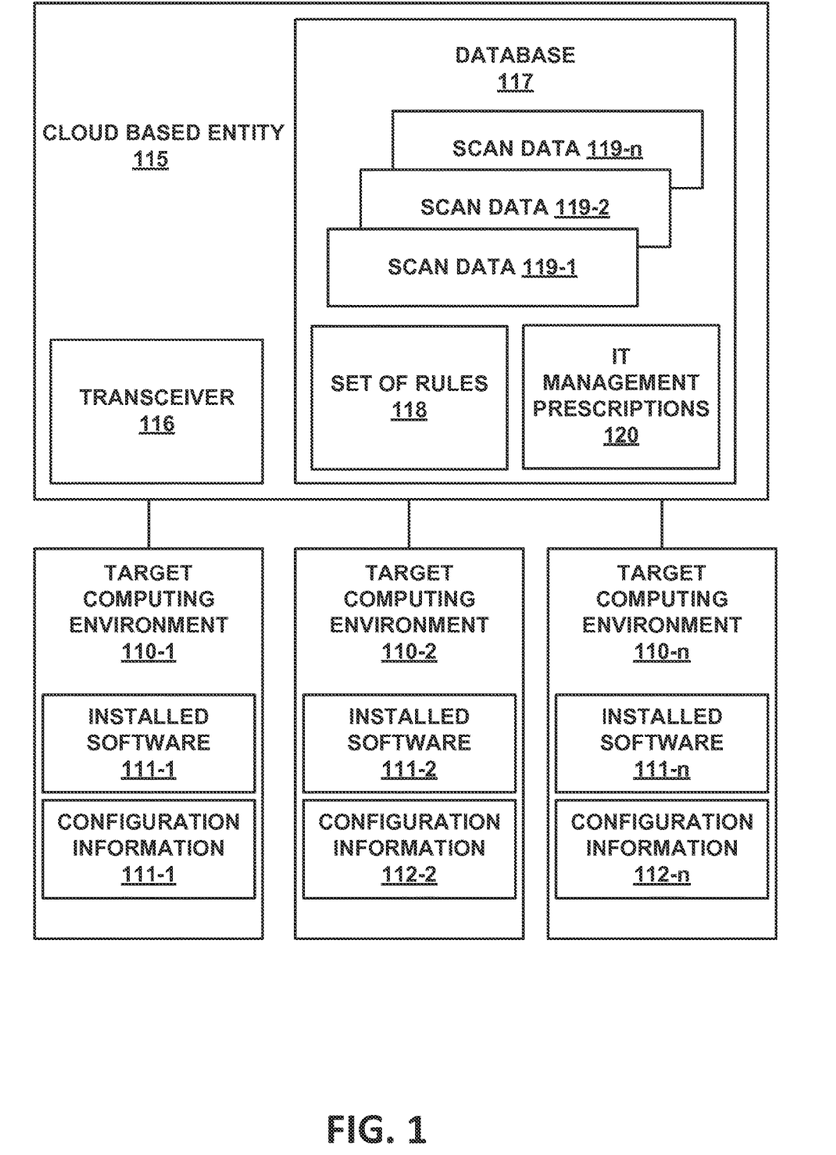
FIG. 1 is an example block diagram illustrating an example cloud based entity that provides an IT management prescription to one or more example target computing environments which are accessing functionality of the cloud based entity, in accordance with embodiments.

FIG. 1 is an example block diagram that illustrates a cloud based entity 115 that provides an IT management prescription 120 for a target computing environment 110, in accordance with an embodiment. FIG. 1 also illustrates a plurality of example target computing environments 110 (110-1, 110-2 . . . 110-*n*) which are accessing functionality of cloud based entity 115, in accordance with embodiments.

For the purposes of this discussion, cloud based entity 115 is a device comprising at least one processor and memory (e.g., a VMware Go™ Cloud). As described herein, cloud based entity 115 may be located in an Internet connected data center or a private cloud computing center coupled with one or more public and/or private networks. Cloud based entity 115 typically couples with a virtual or physical entity in a target computing environment 110 through a network connection which may be a public network connection, private network connection, or some combination thereof. For example, a user in target computing environment 110 may couple via an Internet connection with cloud based entity 115 by accessing a web page or application presented by cloud based entity 115 at a virtual or physical entity within target computing environment 110.

Cloud based entity 115, in one embodiment, includes a transceiver 116 and a database 117. Transceiver 116 operates to send data to and receive data from a target computing environment 110 that has accessed cloud based entity 115. Database 117 provides storage and organization for scan data 119 (119-1, 119-2 . . . 119-*n*, in this example) that is received from a scan performed within a target computing environment 110.

Database 117 also includes set of rules 118, and IT management prescriptions 120, both of which will be further explained below herein. Briefly, though, set of rules 118 is a dynamically alterable rule set which is utilized to analyze scan data 119 received from a target computing environment 110. Based upon the output of application of the rule set 118 to the scan data 119, cloud based entity 115 builds an IT management prescription 120 that is tailored to and sensitive to the context of the particular target computing environment 110, as understood based on the scan data 119 received from that particular target computing environment 110.

Figure 2:
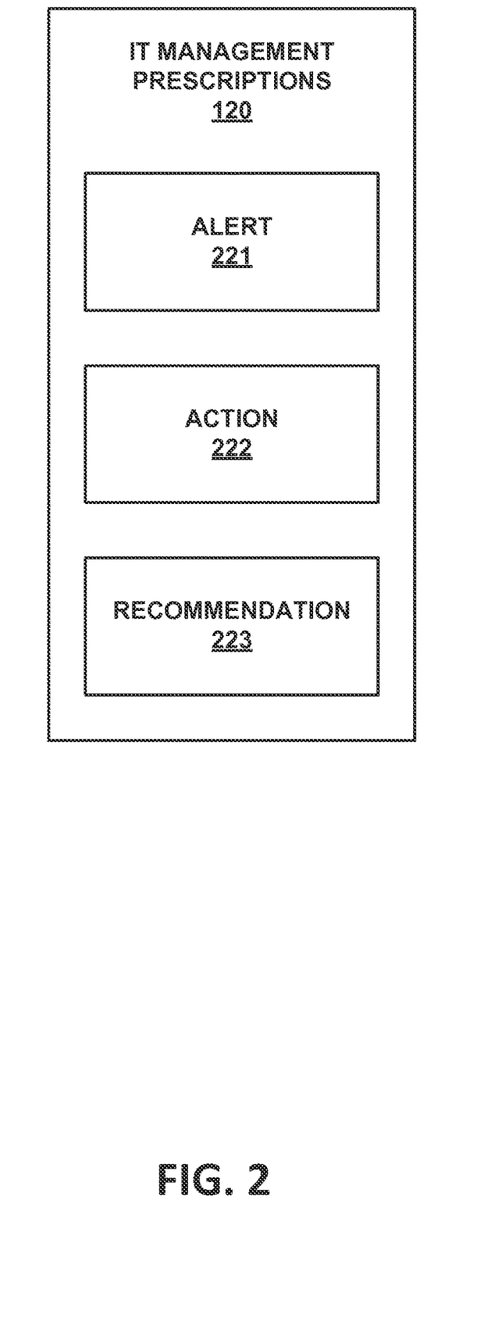
FIG. 2 is an expanded block diagram of the IT management prescriptions of FIG. 1, in accordance with an embodiment.

With reference to FIG. 2, an IT management prescription 120 is an output, which may be pushed to, pulled from, or otherwise made accessible to a user within a particular target computing environment 110, and which describes IT management alerts 221, actions 222, and recommendations 223 that are based on the scanned context of the user's own computing environment. "Context" may include the number and/or type of machines, the kind of software installed, and the state of patches on the machines in a target computing environment 110, among other things.

Example Target Computing Environment

With reference again to FIG. 1, a plurality of target computing environments 110 (110-1, 110-2, 110-*n*) are shown. Each target computing environment comprises a plurality of installed software 111 (111-1, 111-2, 111-*n*) and configuration information 112 (112-1, 112-2, 112-*n*). Embodiments of the illustrated example are scalable, and it should be appreciated that a greater or lesser number of target computing environments 110 may be coupled with cloud based entity 115 at a particular instant in time. A particular target computing environment 110 (110-1, 110-2, 110-*n*), such as target computing environment 110-1, may include a plurality of physical and virtual machines which are coupled with one another in some configuration, and which are typically remotely accessible to an IT professional and/or other user who manages these physical and virtual machines. Such management may include managing one or more of installed software 111-1, installed patches on the installed software 111-1, configuration of installed software 111-1, and the like.

Example Target Computing Environment Scanning

Cloud based entity 115 is operable to scan target computing environments 110 (110-1, 110-2, 110-*n*). For the purposes of this disclosure, performing a scan refers to operations including, but not limited to: downloading data, such as an executable scan utility, to a target computing environment 110 (e.g., 110-1); locally executing a process in the target computing environment 110; collecting scan data 119 from the target computing environment 110 being scanned (e.g., scan data 119-1 from target computing environment 110-1, scan data 119-2 from target computing environment 110-2, and scan data 119-*n* from target computing environment 110-*n*) within the target computing environment 110; filtering the collected scan data 119 within the target computing environment 110 being scanned; uploading scan data 119 from the target computing environment 110, which was scanned, to a cloud based entity 115 for additional processing, etc. Similarly, "performing a scan", "executing a scan", "a scan", "a scanner" and "scanning" may be used interchangeably herein.

As can be seen, a scan involves data being collected by and sent from a device belonging to a target computing environment 110 or having access to the target computing environment 110. For example, a scan may be initiated in target computing environment 110-1 through a web browser on a computer belonging to a user in target computing environment 110-1. While viewing a web page presented by cloud based entity 115, the user may select a selectable scan function on the web page. In response, data such as an executable scan utility is downloaded to the target computing environment 110-1 through the user's browser, and when allowed by the user to execute, a scan of the target computing environment 110-1 is conducted.

In one embodiment, a scan utilizes an agentless scanner and collects scan data 119. In an embodiment, an agentless scanner is a local executable stored in temporary storage of a target computing environment 110 (e.g., a agentless scanner is a dissolving agent that does not persist in storage after scanning has completed). It should be appreciated that although an installed version of the agentless scanner does not persist in storage, the executable may be cached and reused on subsequent executions. An agentless scanner is deployed, remotely scans a target computing environment 110 from a location within the target computing environment 110, and then forwards the collected scan data 119 (which may be processed to some extent before forwarding) to a central location (e.g., cloud based entity 115).

In another embodiment, a scan utilizes an agent, such as a scanning utility that may be installed as a program at one or more locations within a target computing environment 110, and which remains installed (persists in storage) after performing the scan. An installed agent scanner may be downloaded and installed from cloud based entity 115 and similarly scans and forwards scan data 119 as described above with regard to the agentless scanner.

In some embodiments, a single click in a web browser will initiate a scan (e.g., a user in target computing environment 110-1 downloads an executable and performs a scan as was previously described). In one embodiment, a browser provides a locally executing scanner with the same privileges provided on the browser. For example, in an embodiment, scanning is performed using the credentials/ privileges provided to a browser based on the credentials of the user of the browser. If necessary, the agent or agentless scanner requests credentials from a user to access and scan physical and virtual machines in a target computing environment 110. Such credentials are utilized locally and are not forwarded to cloud based entity 115. In one embodiment, a scan is a script. In one embodiment, for example, a utility such as ClickOnce™ by Microsoft™ is utilized to install and run a scan on a target computing environment 110. In one embodiment, Java™ Web Start is utilized to perform a scan. In an embodiment, an executable utilizes an application programming interface (API) to perform a scan. In an embodiment, a finger protocol may be utilized to exchange information between a cloud based entity 115 and a target computing environment 110.

In one embodiment, a scan performs network device discovery and/or mapping. This type of scanning is sometimes referred to as discovery scanning. As an example, a scan may ping various devices to determine the size of a local network and/or discover what type of Internet Protocol (IP) addresses respond on a local network. In one embodiment, a scan further determines hardware within a target computing environment 110 including, but not limited to: memory, processors, motherboards, hard drives, input/output (I/O) devices, etc. In one embodiment, a scan performs port scanning and gathers scan data 119 from a target computing environment which indicates what services (e.g., type of operating system) are available at/within the target computing environment 110.

In an embodiment, a scan determines the installed software 111 within a target computing environment 110. This can also involve the scan gathering configuration information 112 (112-1, 112-2, 112-n) of installed software 111 (111-1, 111-2, 111-n) on machines and virtual machines in a target computing environment 110 (110-1, 110-2, 110-n). Scanning to gather configuration information 112 may be referred to as software management scanning (e.g., gathering information about the operating system configuration, gathering information about management software including information about hardware configuration, etc.).

In an embodiment, a scan may involve a patch management scanner that scans a target computing environment 110 to discover patches installed to installed software 111 of machines and virtual machines in the target computing environment 110. In one embodiment, a patch management scanner is operable to identify both installed and missing security patches.

In one embodiment, a scan determines management information associated with a target computing environment 110 (e.g., windows management classes). For example, in an embodiment, a scan may determine how exposed a target computing environment 110 is to security problems. In one embodiment a system management scanner will determine a series of specific queries for remote management information (e.g., a query/scan may gather information needed for a specific recommendation 223). In an embodiment, File and Registry forensics are used to determine the existence and state of operating system components. For example, a scan may determine whether Internet Information Service (ISS) is installed. In some embodiments, a plurality of system queries may be run to identify the type of target computing environment 110 and/or machine within a target computing environment 110 being scanned (e.g., laptop, desk top, tablet, server, a plurality of servers, etc.).

In an embodiment, scans may be customized. In other words, a user may program a scan to determine whether certain particular components are included within a target computing environment 110 being scanned. In one such embodiment, a user may make such customization by responding to prompts provided prior to, during, or after download of a scan utility from cloud based entity 115. In an embodiment, a specific type of recommendation 223 (of FIG. 2) may be presented as a question to a user in the browser/web user interface, as will be discussed in further detail below. Answering this question may produce input that rules engine 118 utilizes to produce/further refine recommendations 223 that may otherwise be a subjective choice based on forensic evidence.

In some embodiments, a plurality of scans are performed. A plurality of scans may be performed in any manner, including one or more of the scans being performed synchronously, asynchronously, and/or one or more of the scans being performed in a particular order. For example, a network discover scan may be performed, followed by an installed software discover scan, followed by a software configuration scan being performed synchronously with an installed patch scan. In one embodiment, feedback may be provided synchronously such that a user can observe the progress of a scan. In another embodiment, scans are run asynchronously such that rule engine 118 may receive input data other than scan data 119. Scans may also be run asynchronously as a safeguard when a scan fails due to cancellation or failure.

Sending Data to a Cloud Based Entity

In an embodiment, the output of an individual scan is scan data 119 that is sent (e.g., forwarded, streamed, etc.) to cloud based entity 115. In one embodiment, for example, all scan data 119-1, gathered by a scan of target computing environment 110-1 is packaged before it is sent to cloud based entity 115 in a single file transmission. In another embodiment, such scan data e.g., 119-1 is streamed to cloud based entity 115. In such a case, a portion of scan data 119-1 gathered from a scan may be sent to cloud based entity 115 as it is gathered from the scanning process within target computing environment 110-1.

In some embodiments, data is sent to an orchestration layer of a scanner that coordinates scans and the sending of scan data 119 gathered by one or more portions of a scan. For example, scan data 119-1 from a phase of a scan of target computing environment 110-1 may be collected and transferred to cloud based entity 115 in a manner where information is organized as a set of child objects in relationships that may be traversed and evaluated on a backend of cloud based entity 115.

Processing Scanned Data

Additional processing is performed when scan data 119 reaches cloud based entity 115. In various embodiments, scan data 119 is parsed in accordance with a dynamic set of rules 118 to determine an IT management prescription specific to the context of a target computing environment 110-1, 110-2, 110-n. Rules within sets of rules 118 are dynamic (i.e., may change) because updates and patches frequently change.

Set of rules 118 is employed using data structures including, but not limited to: a database 117, a database management system, a look up table, an application data table, a memory table, etc. Set of rules 118 receives data, such as scan data 119 (119-1, 119-2, 119-n) and/or other data, and performs an operation. For example, set of rules 118 may cause cloud based entity 115 to suggest in a management prescription 120 that indicates an update should be installed on target computing environment 110-1 based on scan data 119-1 received from target computing environment 110-1.

Herein, set of rules 118 may also be referred to as a rules engine 118. For example, in some embodiments, a second rule may require the output of a first rule as input for the second rule. In other words, rules may logically chain together to produce various outputs. For example, a rule can require the result of a query that determines the type of operating system running on target computing environment 110-1 before rules engine 118 can run a query to determine whether certain updates are installed based on what operating system is running on target computing environment 110-1. In other words, a rules engine 118 may require the output of a third query, which in turn requires the output of a second query, which in turn requires the output of first query, etc. In one embodiment a single structured query language (SQL) statement will produce a single IT management prescription 120. In some embodiments, multiple operations are performed in response to a single rule included within a set of rules 118.

In one embodiment, a set of rules 118 is configured to parse additional data not associated with a scan in accordance with a dynamic set of rules to determine an IT management prescription 120 specific to the context of said target computing environment 110. For example, information regarding data not associated with a scan (e.g., information about hypervisors, licensing, etc.) may be used as input for rules engine 118 even though the information was not collected by a scan. The additional data may be collected separately from any scan performed in a target computing environment 110. For example, in one embodiment, one or more items of additional data may be collected incidental to the use of and exchange of data with cloud based entity 115.

In one embodiment, results from one scan may be combined with results from a second scan to determine an IT management prescription 120. For example, a first scan may scan half of a network, and a second scan performed at a later date may scan the second half of the network. The second scan may compare or otherwise perform additional operations based at least in part upon the union of the two scans to determine the current state of the network.

Information Technology Management Prescriptions

FIG. 2 is an expanded block diagram of the IT management prescriptions 120 of FIG. 1, in accordance with one embodiment. Cloud based entity 115 provides at least one IT management prescription 120 for access by a user, following a scan of a target computing environment 110. IT management prescriptions 120 comprise alerts 221, actions 222, and recommendations 223.

For example, after a scan is performed, cloud based entity 115 processes scan data 119 using a set of rules 118 and provides a user with an IT management prescription 120. In some embodiments, a plurality of IT management prescriptions 120 are provided. In some embodiments, one or more alerts 221, actions 222, and recommendations 223 are sent in one IT management prescription 120. In accordance with one embodiment, an IT management prescription 120 is pushed from a cloud based entity 115 to an entity in a particular target computing environment 110. While in another embodiment, the IT management prescription 120 may be stored within cloud based entity 115 and accessed at will by a user of particular target computing environment 110.

In some embodiments, various IT management prescriptions 120 are not sent to particular target computing environments 110. IT management prescriptions 120 may not be sent to particular target computing environments 110 for reasons including, but not limited to: regional laws, regulations, access privileges, the particular profile (e.g., whether a user is a government or private entity), etc. For example, a recommendation 223 for purchasing a particular piece of software may not be sent to a user of a target computing environment 110 that resides in a nation where such software cannot be legally acquired (e.g., may be limited due to export control). In another embodiment, if a particular piece of software would normally be recommended for purchase and install, such a recommendation 223 would be withheld if scan data 119 indicates that the user already has the software installed but is not utilizing it. Such withholding of certain management prescriptions 120 is another example of how the IT management prescription 120 is sensitive to the context of a target computing environment 110.

In one embodiment, users may interact with cloud based entity 115. For example, cloud based entity 115 may provide a user with the ability to respond to a question, such as whether a particular security patch is operating correctly. As some examples, answers to questions may be selected by a user from a drop-down menu or entered by a user using a text box. Such questions may be prompted and promulgated in response to the operation of set of rules 118 on a set of scan data 119, and answers to such questions may be used as further input to be evaluated by set of rules 118 in development of a management prescription 120.

Recommendations

In an embodiment, the IT management prescription 120 provided for access by a user may comprise recommendation 223 being provided. In an embodiment, recommendation 223 comprises a suggestion for a user. In various embodiments, IT management prescription 120 may recommend (e.g., prompt a user) to a user to install updates and/or security patches. Recommendations 223 are provided based on the output of one or more rule within set of rules 118. For example, a recommendation 223 may recommend that a user in target computing environment 110-1 expands a VMware vSphere™ to increase the efficiency of target computing environment 110-1.

In one embodiment recommendation 223 is displayed on a web browser, such as in text, to provide an intuitive user interface where an IT management prescription 120 associated with a target computing environment 110 is localized for a user of that computing environment.

In an embodiment, scan data 119 and/or data provided by a set of rules 118 is provided to a user along with a recommendation 223. In some embodiments, very specific facts (e.g., empirical evidence, objective information, etc.) about target computing environment 110 are provided to a user along with a recommendation 223. This way, a user may understand why she received a particular recommendation 223. For example, when a user in target computing environment 110-1 receives a recommendation 223 to expand an installed application, such as VMware vSphere™, to encompass one or more user physical or virtual machines, the user may also receive information regarding the amount of available memory on target computing environment 110-1 and/or an explanation as to why the amount available memory is pertinent to why the user should expand a VMware vSphere™. As another example, after a scan determines that a particular target computing environment 110-1 includes a file server, a user may receive a recommendation 223 to back up data of the file server.

Alerts

In some embodiments, an alert 221 is provided for access by a user as part of an IT management prescription 120. In an embodiment, an alert 221 comprises notifying a user of an attribute of a target computing environment 110 (110-1, 110-2, 110-n). For example, an IT management prescription 120 may provide a text based alert 221 that notifies a user in target computing environment 110-2 that in the last ninety days there has been a large increase in the virtualization of Exchange™. In addition to providing the alert 221, in some embodiments, objective statistics are provided as well, such as which machines in target computing environment 110-2 have virtualized Exchange™. It is appreciated that such objective statistics may be taken from or compiled from scan data 119-2 received from target computing environment 110-2. By providing the alert 221 along with information to make an informed decision, a user may be more likely to act on an alert 221. In this example, a user may be more likely to virtualize Exchange™ based on viewing the objective statistics which are provided.

Actions

In some embodiments, an action 222 for access is provided by a user as part of an IT management prescription 120. In an embodiment, the action 222 comprises performing at least one operation within a target computing environment 110 (110-1, 110-2, 110-n) without interaction by a user or with minimal interaction (e.g., authorization) from a user. In other words, in some embodiments, after a scan, cloud based entity 115 may automatically perform updates and install security patches if so authorized by a user.

In an embodiment, a user is prompted as to whether or not she would like actions 222, or subset thereof, to be performed automatically (e.g., without prompting). For example, an IT professional in target computing environment 110-1 may be prompted the first time a particular patch is installed within target computing environment 110-1 and may simultaneously be asked as to whether they would like to be prompted every time a patch is available.

Return on Investment

In an embodiment, a return on investment calculation is provided as part of IT management prescription 120. For example, the cost of particular piece of software that is recommended for installation or increased utilization, along with the estimated amount a user will save by reduced IT management man-hours may be sent to a user along with an IT management prescription 120. Thus, the cost savings can be presented in a manner which informs the user how long it may take to realize a return on investment for following through on alert 221, action 222, or recommendation 223. In one embodiment, a return on investment calculation will provide the date when a user will recoup the cost.

Example Trend Detection

In an embodiment, data (e.g., scan data 119) is compared to aggregated data collected from various target computing environments 110-1, 110-2, 110-n to determine the IT management prescription 120 based on a dynamic set of rules 118 and the results of the comparison. For example, if a cloud based entity 115 receives data indicating that a particular percentage of target computing environments 110-2 through 110-n have installed a particular security patch, cloud based entity 115 may provide a recommendation 223 to a user in target computing environment 110-1 suggesting that the user install the particular security patch if target computing environment 110-1 does not have the security patch installed.

In one example, a company that has a plurality of target computing environments 110 located in different states or countries, may initiate a single scan to gather and compare scan data 119 from all of its target computing environments 110. Trends across these computing environments can then be determined and presented to the user in the form of an IT management prescription 120.

Example Methods of Operation

Figure 3:
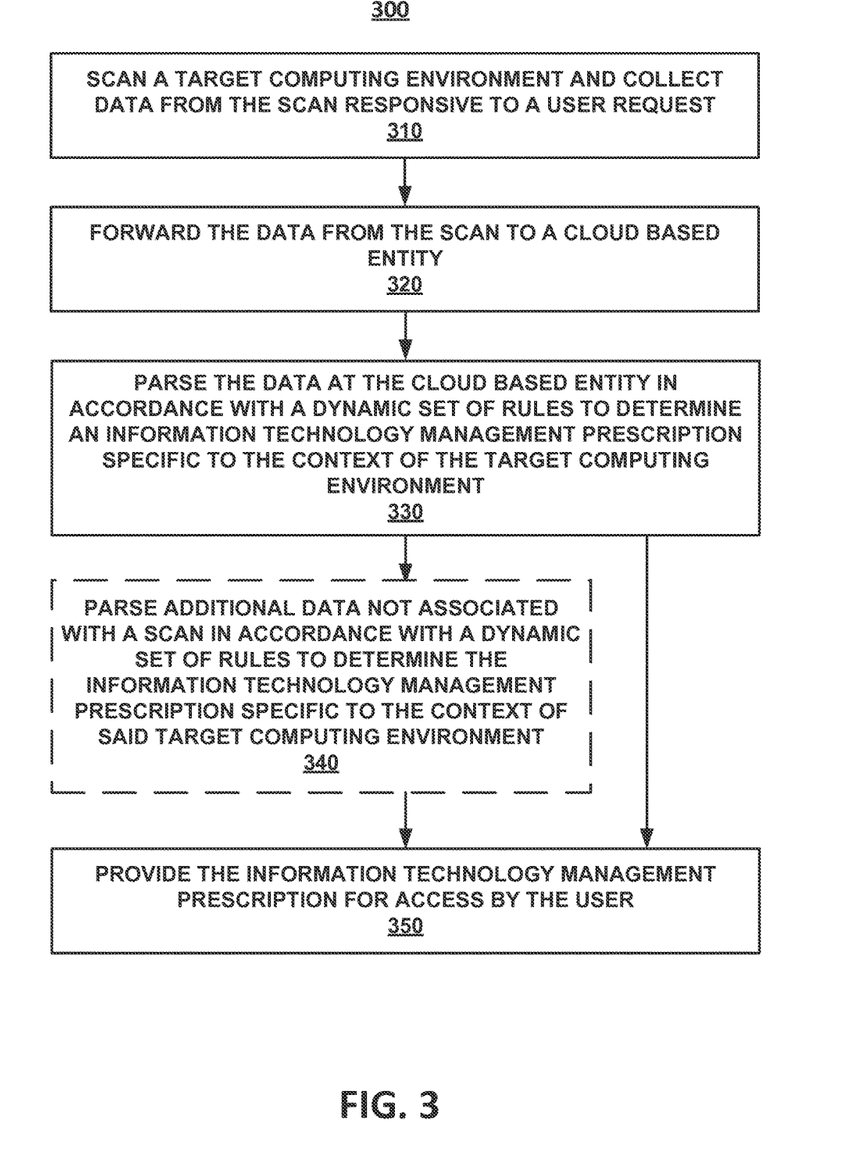
FIG. 3 is a flow diagram of a method of providing a context sensitive IT management prescription, in accordance with various embodiments.
Figure 4:
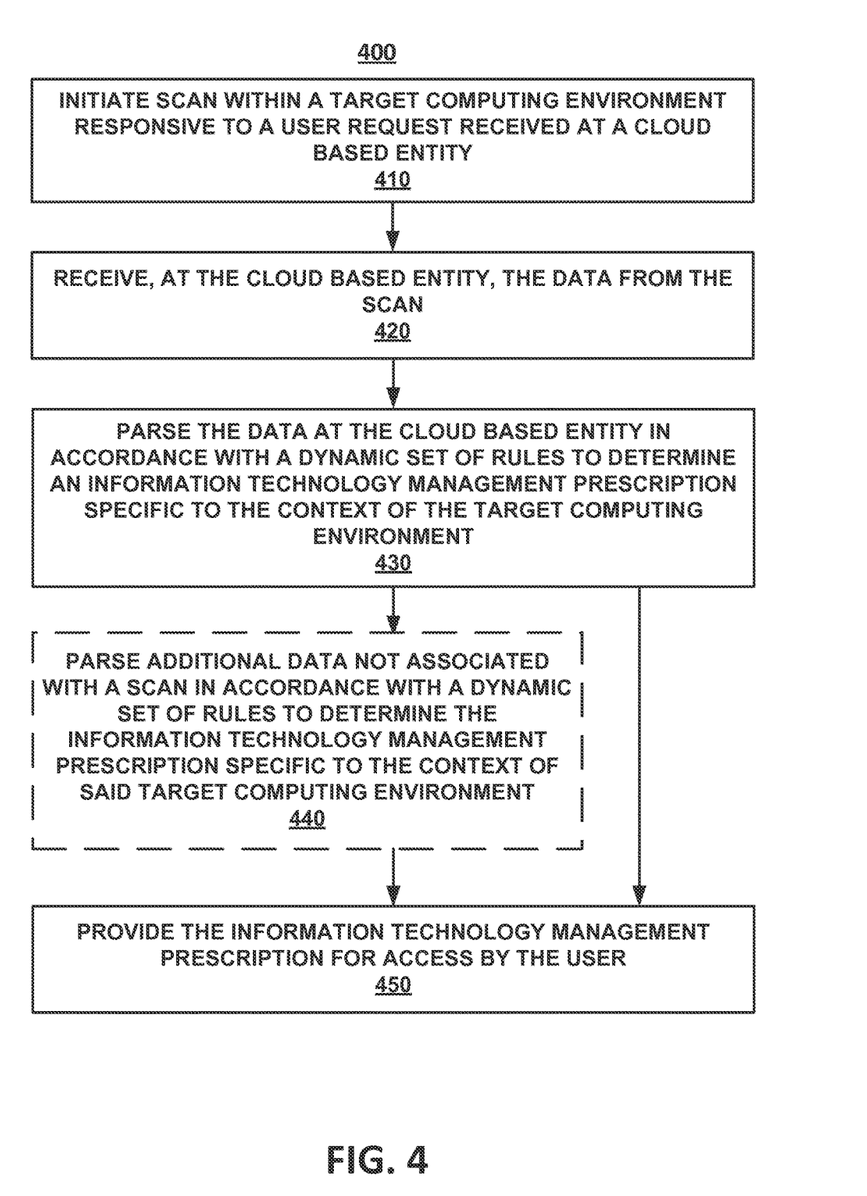
FIG. 4 is a flow diagram of another method of providing a context sensitive IT management prescription, in accordance with various embodiments.

The following discussion sets forth in detail the operation of some example methods of operation of embodiments. With reference to FIGS. 3 and 4, flow diagram 300 and 400 illustrate example procedures used by various embodiments. Flow diagrams 300 and 400 include some procedures that, in various embodiments, are carried out by a processor under the control of computer-readable and computer-executable instructions. In this fashion, procedures described herein and in conjunction with flow diagrams 300 and/or 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with target computer environments 110 and/or cloud based entity 115. The computer-readable and computer-executable instructions, which reside on tangible computer readable storage media, are used to control or operate in conjunction with, for example, one or some combination of processors of target computer environments 110 and/or cloud based entity 115. It is appreciated that the processor(s) may be physical or virtual or some combination (it should also be appreciated that a virtual processor is implemented on physical hardware). Although specific procedures are disclosed in flow diagrams 300 and 400, such procedures are examples. That is, embodiments are well suited to performing various other procedures or variations of the procedures recited in flow diagrams 300 and/or 400. Likewise, in some embodiments, the procedures in flow diagrams 300 and/or 400 may be performed in an order different than presented and/or not all of the procedures described in one or more of these flow diagrams may be performed. It is further appreciated that procedures described in flow diagrams 300 and/or 400 may be implemented in hardware, or a combination of hardware with firmware and/or software.

FIG. 3 is a flow diagram 300 of a method of providing a context sensitive IT management prescription, in accordance with various embodiments.

At procedure 310 of flow diagram 300, in one embodiment, a target computing environment 110 (e.g., 110-1) is scanned and scan data 119 (e.g., 119-1 from target computing environment 110-1) is collected from the scan, responsive to a user request. As discussed above, a scan may be initiated from a central location by a user. For example, a user may launch a scan of all physical and virtual machines in target computing environment 110-1 with a web browser on a single machine in the computing environment. In one embodiment, a scan may be initiated from a machine remote from the target computing environment 110-1 being scanned. In some embodiments, a user must provide credentials to launch a scan, while in others the scan may be carried out by the privileges and/or credentials inherent to the software that the user is using.

At procedure 320 of flow diagram 300, in one embodiment, scan data 119 (e.g., 119-1 from target computing environment 110-1) is forwarded to a cloud based entity 115. After a scan is performed scan data 119 gathered by the scan is sent to cloud based entity 115. In some embodiments, scan data 119 is sent in a particular type of data structure. In some embodiments, scan data 119 is streamed to cloud based entity 115.

At procedure 330 of flow diagram 300, in one embodiment, scan data 119 is parsed at the cloud based entity 115 in accordance with a dynamic set of rules 118 to determine an IT management prescription 120 specific to the context of the target computing environment 110 (e.g., 110-1 which was scanned). Based on scan data 119 cloud based entity 115 utilizes set of rules 118, to produce an output. In some embodiments, the set of rules 118 operates as an engine which chains operations together (i.e., a rules engine 118 uses the output of a first operation as the input for a second operation). An IT management prescription 120 is the final output from rules engine 118. The IT management prescription 120 is provided to a user. In an embodiment, an IT management prescription 120 may comprise an alert 221, an action 222, and/or a recommendation 223, as are described above.

At procedure 340 of flow diagram 300, in some embodiments, additional data not associated with a scan is parsed in accordance with a dynamic set of rules 118 to determine the IT management prescription 120 specific to the context of the target computing environment 110. In an embodiment, additional data may include, but is not limited to: information associated with the scanner, information associated with cloud based entity 115, information associated with hypervisors, information associated with licensing, etc. The additional data may be collected in a collection action separate from any scanning which is performed in target computing environment 110. For example, in one embodiment, one or more items of additional data may be collected incidental to the use of and exchange of data with cloud based entity 115. It is appreciated that additional data not associated with a scan may not always exist or be parsed, and thus, in some embodiments, procedure 340 may not be undertaken.

At procedure 350 of flow diagram 300, in one embodiment, the IT management prescription 120 is provided for access by the user. In some embodiments, along with an alert 221, action 222, and/or recommendation 223, data associated with target computing environments 110-1, 110-2, 110-n is provided to a user.

FIG. 4 is a flow diagram 400 of a method implemented by a system for providing a context sensitive IT management prescription 120, in accordance with various embodiments.

At procedure 410 of flow diagram 400, in one embodiment, a scan is initiated within a target computing environment 110 (e.g., 110-1) responsive to a user request received at a cloud based entity 115. In an embodiment, when cloud based entity 115 receives a request from a user, a temporary executable is sent to physical and virtual machines in target computing environments 110-1.

At procedure 420 of flow diagram 400, in one embodiment, scan data 119 (e.g., 119-1 from target computing environment 110-1) is received at a cloud based entity 115. Scan data 119 may include, but is not limited to: the installed software 111 in a target computing environment 110, various configuration information on a physical machine or virtual machine in a target computing environment 110, the hardware comprising user a target computing environment 110, updates installed to software and/or firmware with a target computing environment 110, patches installed to software 111 with a target computing environment 110, etc.

At procedure 430 of flow diagram 400, in one embodiment, scan data 119 (e.g., 119-1 from a target computing environment 110-1) is parsed at the cloud based entity 115 in accordance with a dynamic set of rules 118 to determine an IT management prescription 120 specific to the context of the target computing environment 110. In an embodiment, based on a dynamic set of rules 118 an IT management prescription 120 is sent to a user.

At procedure 440 of flow diagram 400, in some embodiments, additional data not associated with a scan is parsed in accordance with a dynamic set of rules 118 to determine the IT management prescription 120 specific to the context of the target computing environment 110. In an embodiment, additional data may include, but is not limited to: information associated with the scanner, information associated with cloud based entity 115, information associated with hypervisors, information associated with licensing, etc. The additional data may be collected in a collection action separate from any scanning which is performed in target computing environment 110. For example, in one embodiment, one or more items of additional data may be collected incidental to the use of and exchange of data with cloud based entity 115. It is appreciated that additional data not associated with a scan may not always exist or be parsed, and thus, in some embodiments, procedure 440 may not be undertaken.

At procedure 450 of flow diagram 400, in one embodiment, the IT management prescription 120 is provided for access by the user. The IT management prescription 120 may comprise an alert 221, an action 222, and/or a recommendation 223, as described above. In addition, in various embodiments, cloud based entity 115 sends a question to a user and cloud based entity 115 is operable to receive a response from the user.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method of providing a context sensitive information technology (IT) management prescription, said method comprising:
   receiving at a cloud-based entity a request from a user;
   in response to receiving the request, sending instructions to an entity in a target computing environment such that the entity, in response to receiving the instructions, scans the target computing environment and collects data from said scan, the scanning including (a) patch management scanning to discover patches installed to software of physical machines and virtual machines in said target computing environment, and (b) network discovery scanning to discover the physical machines and the virtual machines in said target computing environment;

receiving at the cloud-based entity portions of said data from said scan of the target computing environment after the portions of the data are collected from the scan;

parsing said data at said cloud-based entity in accordance with a dynamic set of rules;

determining an IT management prescription specific to a context of said target computing environment based on the parsing of the data, the IT management prescription including: (1) an alert configured to notify the user of an attribute of the target computing environment, and (2) a set of actions, each action from the set of actions configured to cause an operation to be performed within the target computing environment;

determining that a first operation associated with a first action from the set of actions cannot be performed within the target computing environment based on restrictions associated with the target computing environment;

removing the first action from the IT management prescription in response to determining that the first operation associated with the first action cannot be performed;

providing said IT management prescription to the entity in the target computing environment for access by said user after removing the first action from the IT management prescription such that a second operation associated with a second action from the set of actions is performed in the target computing environment.

2. The method of claim 1, wherein the dynamic set of rules is a first dynamic set of rules, and said method further comprises:

parsing additional data not associated with the scan in accordance with a second dynamic set of rules, the IT management prescription determined based on the parsing the data from the scan and the parsing the additional data not associated with the scan.

3. The method as recited in claim 1, wherein the scanning and collecting further includes:

utilizing access credentials provided by the user to access the physical machines and the virtual machines in said target computing environment.

4. The method as recited in claim 1, wherein the scanning further includes:

scanning said target computing environment using an agentless scanner that is not installed on an entity in the target computing environment.

5. The method as recited in claim 1, wherein the scanning further includes:

software discovery scanning to discover the software installed on the physical machines and the virtual machines in said target computing environment.

6. The method as recited in claim 1, wherein the scanning further includes:

software management scanning to discover installed configuration information of the software installed on the physical machines and the virtual machines in said target computing environment.

7. The method as recited in claim 1, wherein the target computing environment is a first target computing environment, and said parsing said data at said cloud-based entity in accordance with the dynamic set of rules includes:

comparing said data to aggregated data collected from a second target computing environment different from the first target computing environment.

8. The method as recited in claim 1, wherein the scan is a first scan, said parsing said data at said cloud-based entity in accordance with the dynamic set of rules including:

utilizing scan data received from a second scan in conjunction with scan data received from said first scan.

9. The method as recited in claim 1, wherein said providing said IT management prescription includes:

pushing said IT management prescription from said cloud-based entity to the entity in said target computing environment.

10. The method as recited in claim 1, wherein said providing said IT management prescription to the user includes:

providing a recommendation including information associated with performing a third operation within the target computing environment;

receiving a response from the user in response to providing the recommendation; and modifying the recommendation based on the response from the user.

11. A non-transitory computer usable storage medium having instructions that when executed cause a computer system to perform a method for providing a context sensitive IT management prescription, said method comprising:

receiving at a cloud-based entity a request from a user;

in response to receiving the request, sending instructions to an entity in a target computing environment such that the entity, in response to receiving the instructions, scans the target computing environment and collects data from said scan, the scanning including (a) patch management scanning to discover patches installed to software of physical machines and virtual machines in said target computing environment, and (b) network discovery scanning to discover the physical machines and the virtual machines in said target computing environment;

receiving at the cloud-based entity portions of said data from said scan of the target computing environment after the portions are collected from the scan;

parsing said data at said cloud based entity in accordance with a dynamic set of rules that includes: (1) a first rule configured to process the data to provide a first output, and (2) a second rule configured to process the data using the first output to provide a second output;

determining an IT management prescription specific to a context of said target computing environment based on the parsing of the data, the IT management prescription including: (1) an alert configured to notify the user of an attribute of the target computing environment, and (2) an action configured to cause an operation to be performed within the target computing environment;

providing said IT management prescription to the entity in the target computing environment for access by said user such that the operation is performed in the target computing environment.

12. The non-transitory computer usable storage medium of claim 11, wherein the scanning and collecting further includes:

utilizing access credentials provided by the user to access the physical machines and the virtual machines in said target computing environment.

13. The non-transitory computer usable storage medium of claim 11, wherein the scanning further includes:

scanning said target computing environment using an agentless scanner that is not installed on the entity in the target computing environment.

14. The non-transitory computer usable storage medium of claim 11, wherein the scanning further includes:
   software discovery scanning to discover the software installed on the physical machines and the virtual machines in said target computing environment.

15. The non-transitory computer usable storage medium of claim 11, wherein the scanning further includes:
   software management scanning to discover installed configuration information of the software installed on the physical machines and the virtual machines in said target computing environment.

16. The non-transitory computer usable storage medium of claim 11, wherein the target computing environment is a first target computing environment, and said parsing said data at said cloud-based entity in accordance with the dynamic set of rules includes:
   comparing said data to aggregated data collected from a second target computing environment different from the first target computing environment.

17. The non-transitory computer usable storage medium of claim 11, wherein the operation is a first operation, and said providing said IT management prescription to the user includes:
   providing a recommendation including information associated with performing a second operation within the target computing environment;
   receiving a response from the user in response to providing the recommendation; and
   modifying the recommendation based on the response from the user.

18. A computer implemented system for providing a context sensitive IT management prescription, said computer implemented system comprising:
   a transceiver configured to:
      send a scanning utility to an entity in a target computing environment such that the scanning utility, when received by the entity, performs (a) patch management scanning to discover patches installed to software of physical machines and virtual machines in said target computing environment, and (b) network discovery scanning to discover the physical machines and the virtual machines in said target computing environment;
      receive portions of scan data from the target computing environment after the portions are gathered during the patch management scanning and the network discovery scanning; and
      provide an IT management prescription through a network to the entity in said target computing environment for access by a user such that an operation associated with an action is performed in the target computing environment;
   a database comprising a dynamic set of rules; and
   a processor operatively coupled to the transceiver and the database, the processor configured to:
      parse said scan data in accordance with said dynamic set of rules, and
   define the IT management prescription specific to a context of said target computing environment based on the parsing of the scan data, said IT management prescription including: (1) an alert configured to notify the user of an attribute of said target computing environment, (2) the action configured to cause the operation to be performed within said target computing environment, and (3) a return on investment calculation that is (a) based on a cost savings that is associated with a projection of reduced IT management man-hours that results from performing the operation in the IT management prescription, and (b) includes a date of when the user can expect to recoup a cost associated with performing the operation.

19. The system of claim 18, wherein the target computing environment is a first target computing environment and said processor is further configured to compare said data to aggregated data collected from a second target computing environment different from the first target computing environment.

20. The system of claim 18, wherein performing the operation includes installing a software, and the cost associated with performing the operation is a cost of the software.

* * * * *